(12) United States Patent
Humphrey et al.

(10) Patent No.: US 9,787,136 B2
(45) Date of Patent: Oct. 10, 2017

(54) INTERRUPTION OF OUTPUT POWER AND AUXILIARY POWER (71) Applicant: Hewlett Packard Enterprise Development LP, Houston, TX (US)

(72) Inventors: Daniel Humphrey, Houston, TX (US); Mohamed Amin Bemat, Houston, TX (US); Samantha Jean Castillo, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 114 days.

(21) Appl. No.: 14/901,247

(22) PCT Filed: Jun. 28, 2013

(86) PCT No.: PCT/US2013/048449
§ 371 (c)(1),
(2) Date: Dec. 28, 2015

(87) PCT Pub. No.: WO2014/209338
PCT Pub. Date: Dec. 31, 2014

(65) Prior Publication Data
US 2016/0156222 A1 Jun. 2, 2016

(51) Int. Cl.
*H02J 7/00* (2006.01)
*H02J 9/00* (2006.01)
*H02J 9/06* (2006.01)

(52) U.S. Cl.
CPC ............... *H02J 9/061* (2013.01); *H02J 9/00* (2013.01); *H02J 9/002* (2013.01)

(58) Field of Classification Search
USPC .................................................... 307/23, 64
See application file for complete search history.

(56) References Cited

U.S. PATENT DOCUMENTS 4,935,858 A * 6/1990 Panicali ............ H02M 3/33561
323/267
6,476,519 B1 11/2002 Weiner et al.
(Continued)

FOREIGN PATENT DOCUMENTS

CN 201004555 Y 1/2008
CN 102280925 A 12/2011
(Continued)

OTHER PUBLICATIONS

Extended European Search Report received in EP Application No. 13888433.3, dated Mar. 7, 2017, 8 pages.
(Continued)

*Primary Examiner* — Adam Houston
(74) *Attorney, Agent, or Firm* — Hewlett Packard Enterprise Patent Department (57) ABSTRACT

Examples disclose a system comprising a power supply, coupled to an output power and an auxiliary power. The system is further comprising a controller to interrupt the output power through a switch coupled to the output. The controller is to interrupt the output power based a determination the output power is below an output threshold. The controller is further to interrupt the auxiliary power coupled to the output. The controller is to interrupt the auxiliary power based on a determination the auxiliary power is below an auxiliary threshold. Additionally, the system discloses the switch is to disconnect the output power.

15 Claims, 5 Drawing Sheets

(56) References Cited

U.S. PATENT DOCUMENTS

| | | |
|---|---|---|
| 7,287,175 B2 | 10/2007 | Vereen et al. |
| 8,159,837 B2 | 4/2012 | Dishman et al. |
| 2006/0044721 A1 | 3/2006 | Henderson |
| 2008/0136594 A1 | 6/2008 | Jung et al. |
| 2009/0146610 A1* | 6/2009 | Trigiani ............... H02J 7/0018 320/119 |
| 2010/0019574 A1* | 1/2010 | Baldassarre ............. H02J 3/14 307/23 |
| 2013/0113288 A1* | 5/2013 | Chen ........................ H02J 9/06 307/64 |
| 2016/0156222 A1* | 6/2016 | Humphrey ............... H02J 9/00 307/64 |

FOREIGN PATENT DOCUMENTS

| | | |
|---|---|---|
| JP | 2011244605 A | 12/2011 |
| WO | WO-2010084444 A | 7/2010 |

OTHER PUBLICATIONS

Aebischer, B, et al., Energy Efficiency of Computer Power Supply Units, (Research Paper), Nov. 2012.
ISR/WO, PCT/US2013/048449, HP reference 88289197, Mar. 31, 2014, 10 pps.

\* cited by examiner

INTERRUPTION OF OUTPUT POWER AND AUXILIARY POWER

BACKGROUND

A power system may include a power supply and a power converter to deliver power to a load. The power supply is a device that supplies electrical power to the load. The power converter converts energy in the power system from one form of electrical energy to another form of electrical energy for consumption by the load.

BRIEF DESCRIPTION OF THE DRAWINGS

In the accompanying drawings, like numerals refer to like components or blocks. The following detailed description references the drawings, wherein.

DETAILED DESCRIPTION

A power supply may include two separate power converters to provide isolation from one another and for each converter to provide its own output to complete a powering down sequence. For example, one of the converters may include a main power output while the other converter may include an auxiliary output. The main power output may be utilized to support higher powered functions and/or components and as such may include, but should not be limited to processing units, memories, hard drive, fans, motors, etc. The auxiliary output may be utilized to support lower powered functions and/or components and as such may include, but should not be limited to inventory of components, fault reporting, faulting logging, tracking log files, etc.

Including two separate power converters in the power supply leads to increase costs and space as there may be limitations on electrical component space. Additionally, other power supplies may include an individual output power converter; however, this may cause a change in the powering down sequence which may cause issues with fault logging and the sequence of powering down a system.

To address these issues, examples disclosed herein provide a power system including a power supply coupled to an output to provide an output power and an auxiliary power. Including the power supply coupled to the output to provide both the output power and the auxiliary power decreases the size of a power supply by eliminating a separate power converter. This further enables the power system to maintain a proper power down sequence with an individual power converter.

Additionally, the examples provide a controller to determine whether the output power has fallen below an output threshold and if so, a switch interrupts the flow of output power to a load. The controller may then determine whether the auxiliary power has fallen below an auxiliary threshold and if so, may then interrupt the flow of the auxiliary power to an auxiliary load. When there is a loss of input power by the power supply, the output power is interrupted prior to the auxiliary power. The output power provides power to processing units, hard drives, and other higher powered functions, while the auxiliary power provides power to for fault reporting, etc. Interrupting the flow of output power and then the flow of auxiliary power, enables proper fault reporting and to properly complete a power down sequence of a power system as the auxiliary power may provide power longer than the output power. Additionally, maintaining the power down sequence within the power system, the controller to shut down parts of system to ensure the power system is operating with minimal errors.

In another example, the auxiliary power may include a longer duration of holdup than the output power. The holdup is a period of time in which a power supply's output may remain within a power range after the input power to the power supply may cease operating. In this example, once the switch is disconnected, the power supply may provide a remainder of stored energy as the auxiliary power to the auxiliary load. This implementation enables the auxiliary load to provide more reliable data as it may be operational for a longer period of time.

In a further example, the controller is further to monitor the output power and the auxiliary power for the output threshold and auxiliary threshold, respectively. This example further provides an additional efficiency to monitor each power to determine when the power system may be entering a power down sequence and providing protection from further data loss.

In summary, examples disclosed herein provide a power system to maintain a power down sequence while eliminate an additional power converter. Additionally, the examples maintain a proper power down sequence to provide more reliable data through enabling the auxiliary power to maintain operation for a longer period of time.

Figure 1:
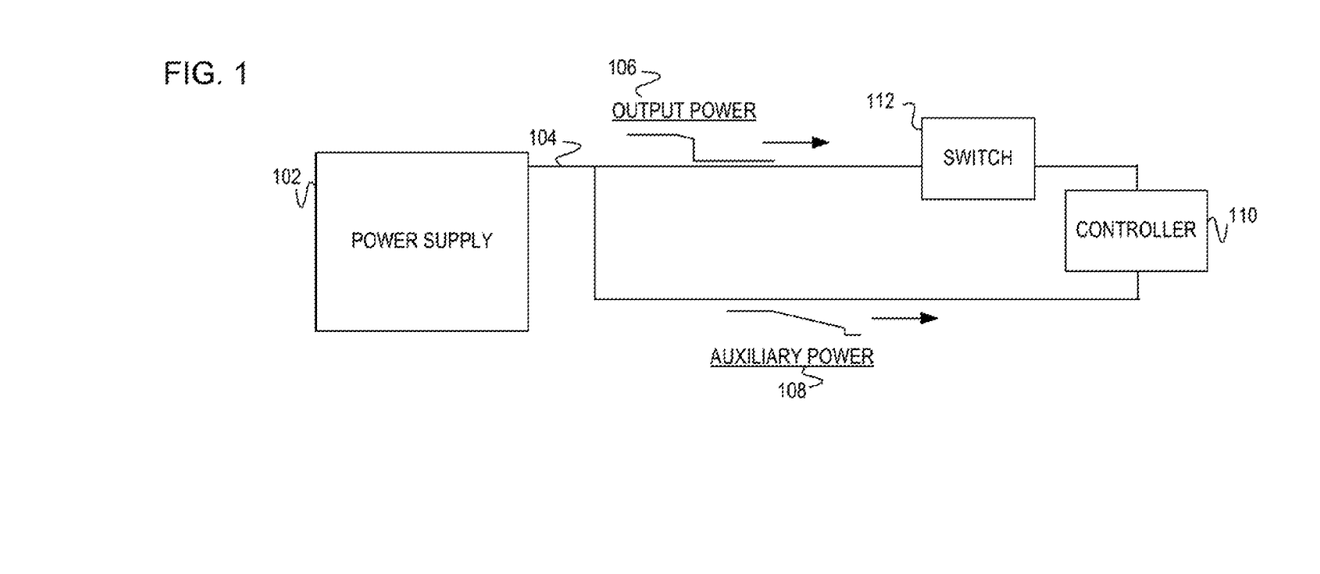
FIG. 1 is a block diagram of an example power system including a power supply coupled to an output to provide an output power through a switch and an auxiliary power.

Referring now to the figures, FIG. 1 is a block diagram of an example power system including a power supply 102 coupled to an output 104 to provide an auxiliary power 108 and an output power 106 through a switch 112. The power system further includes a controller 110 to monitor the output power 106 for an output threshold and the auxiliary power 108 for an auxiliary threshold. The power system illustrates components to maintain a power down sequence when experiencing a loss of input power by the power supply 102. The power system maintains the power down sequence by monitoring the powers 106 and 108 each for a minimal power regulation. Additionally, the power system may include other components not illustrated in FIG. 1 as this was done for illustration purposes and not for limiting implementations of the power system. For example, the controller 110 may be coupled to a load. This example is described in detail in the next figure. Implementations of the power system include a power supply system, computing system, server system, distributed power system, or other type of power system capable of supporting the components 102, 110, and 112 in FIG. 1.

The power supply 102 is coupled to the output 104 to provide the output power 106 and the auxiliary power 108 to loads. The power supply 102 may receive an indication of an input power loss (not illustrated) which may signal to the controller 110 to monitor the powers 106 and 108 for their respective thresholds. The power supply 102 includes a power converter to provide the powers 106 and 108 on the output 104. Including the power converter coupled to the output 104 to provide both output powers 106 and 108 eliminates an additional separate converter within the power supply 102. Implementations of the power supply 102 include a power feed, power source, generator, power circuit, energy storage, power system, or other type of power supply capable of providing both the output power 106 and the auxiliary power 108 from the output 104.

The output 104 is an electrical conductor connected to the power supply 102 to deliver both the output power 106 and the auxiliary power 108. In one implementation, the output 104 is provided from a power converter internal to the power supply 102. In this implementation, an individual power converter may be utilized to provide both the output power 106 and the auxiliary power 108 rather than two separate outputs each providing the respective power 106 and 108.

The output power 106 is an electrical charge provided from the power supply 102 through the output 104. The output power 106 is provided when the switch 112 is connected to provide the power 106. The controller 110 monitors the output power 106 to ensure a magnitude of the output power 106 is within an acceptable range of specified limits. If the controller 110 determines the output power 106 is below a specified output threshold, the controller 110 transmits a signal to the switch 112 to interrupt the output power 106 delivered to the load. Implementations of the output power 106 include a current, voltage, and/or other electrical charge capable of providing power to a primary load. In one implementation, the output power 106 is provided to the primary or main load (not illustrated).

The output power 106 is provided to the main load to support higher-powered functions of the main load. For example, the higher powered functions may include, but should not be limited to a central processing unit, processing unit(s), hard drive(s), corresponding memories, etc. The auxiliary power 108 is provided to the auxiliary load to support lower-powered functions. For example, these lower powered functions may include, but should not be limited to maintaining a data log, inventory of components from within a load (e.g., server), error reporting, etc. In this regard, the auxiliary power 108 is an additional and/or supplementary to the output power 106 as it provides a lower-power in magnitude than the output power 106. The output threshold and the auxiliary threshold are specified minimal power limits, such as a voltage regulation, in which to support their respective loads (i.e., main load and auxiliary load) before conserving the power and/or powering down the power supply 102. Each of these thresholds are observed from the waveform corresponding to each power 106 and 108 before each power 106 and 108 drops. In another implementation, the auxiliary power 108 may include a longer duration of providing power 108 than the output power 106. For example, the output power 106 may include a high magnitude of power as in the waveform illustration. Then once the switch 112 is disconnected, the output power 106 turns off. In another example, the auxiliary power 108 may include a high magnitude of power as in the waveform illustration, but will slowly bleed off the auxiliary power 108 before turning off. This may occur as the power supply 102 includes a capacitor (not illustrated) which will bleed down the remaining energy to the auxiliary power 108 once the switch 112 is disconnected. These examples are illustrated in detail in later figures.

The auxiliary power 108 is monitored by the controller 110 for the auxiliary threshold and provided to an auxiliary load (not illustrated). In one implementation, an auxiliary switch may be located between the power supply 102 and the auxiliary load to interrupt flow of the auxiliary power 108 (e.g., the flow of current to the auxiliary load). Implementations of the auxiliary power 108 include a current, voltage, and/or other electrical charge capable of providing power to the auxiliary load.

The controller 110 manages the functions and operations of the power system in FIG. 1. Specifically, the controller 110 monitors the output power 106 for the output threshold and the auxiliary power 108 for the auxiliary threshold. As such, the controller 110 may monitor these powers 106 and 108 by taking measurements of the power. In this implementation, the controller 110 may include a meter and/or sensor to monitor the output power 106 and the auxiliary power 108 for their respective threshold. If the controller 110 determines the output power 106 has fallen below the output threshold, the controller may transmit a signal to the switch 112 to interrupt the flow of the current corresponding to the output power 106. In this implementation, by disconnecting the switch 112 to interrupt the output power 106, the controller 110 may direct the remaining power at the power supply 102 to support the auxiliary power 108. This implementation ensures support for the auxiliary load for a longer duration. For example, assume the output threshold is 12.0 volts and the output power 106 may be around 11 volts which is below the output threshold. Thus, in this example, the controller 110 may signal to the switch 112 to disconnect and maintaining the 11 volts from the power supply 102 to the path of the auxiliary power 108. If the controller 110 determines the auxiliary power 108 has fallen below the auxiliary threshold, the controller 110 may transmit a signal to power down the power supply 102 and/or transmit a signal to an auxiliary switch to interrupt the flow of the auxiliary power 108 to the auxiliary load. Although FIG. 1 illustrates the controller 110 as separate from the power supply 102, implementations should not be limited as this was done for illustration purposes and not for limiting purposes. For example, the controller 110 may be included as part of the power supply 102 or the loads (not illustrated). Implementations of the controller include a processor, circuit logic, a set of instructions executable by a processor, a microchip, chipset, electronic circuit, microprocessor, semiconductor, microcontroller, central processing unit (CPU), or other device capable of monitoring the output power 106 and the auxiliary power 108.

The switch 112, located between the controller 110 and the power supply 102, delivers the output power 106 to the main load. In one implementation, the switch 112 interrupts the flow of the output power 106 to the main load by preventing the output power 106 from reaching the main load. In another implementation, the switch 112 may be opened to interrupt the flow of the output power 106 to the controller 110 and/or main load. In a further implementation, the switch 112 isolates the output power 106 from the auxiliary power 108. Implementations of the switch 112 include an electromechanical device, electrical device, switching voltage regulator, transistor, relay, logic gate, binary state logic, or other type of electrical device that may interrupt the flow of the output power 106. In yet a further implementation, the switch 112 may disable the main load and/or the auxiliary load. In this implementation, the switch 112 may not prevent the flow of the output power 106 and/or the auxiliary power 108, rather the switch 112 disables the loads that may be consuming the power 106 and/or 108.

Figure 2A:
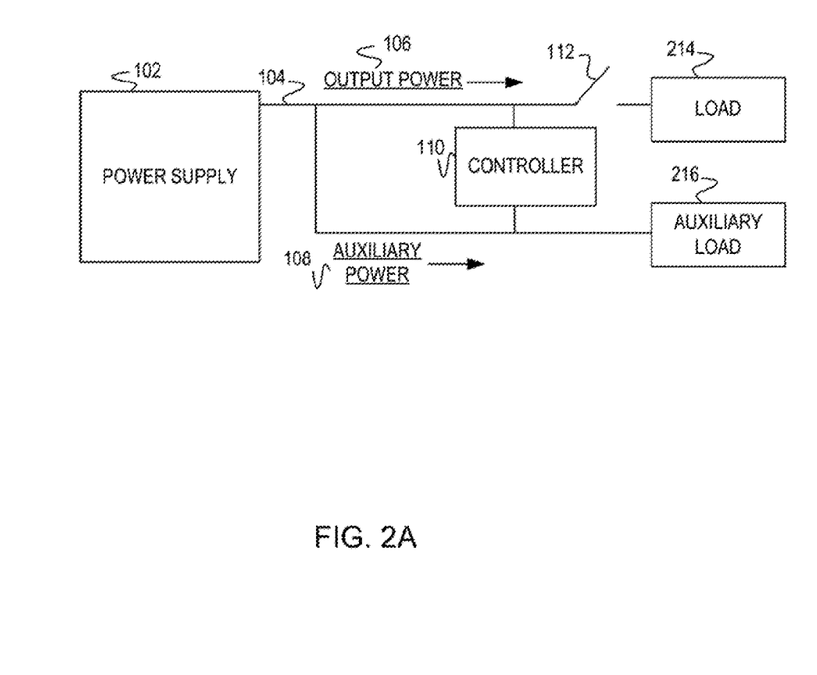
FIG. 2A is a diagram of an example power supply to provide an output power and an auxiliary power to a load and an auxiliary load, accordingly.

FIG. 2A is a block diagram of an example power supply 102 coupled to an output 104 to provide an output power 106 to a load 214 and auxiliary power 108 to an auxiliary load 216. The power supply 102 may receive an indication of an input power loss (not pictured) and as such the controller 110 may monitor each power 106 and 108 to ensure these powers 106 and 108 do not fall below a particular threshold. The controller monitors the output power 106 for an output threshold and the auxiliary power 108 for an auxiliary threshold. The output threshold and the auxiliary threshold, are each a particular power regulation the powers 106 and 108 may maintain to support the load 214 and the auxiliary load 216. The output threshold may be different from the auxiliary threshold as the load 214 may utilize more power than the auxiliary load 216. If the controller 110 determines the output power 106 is below the output threshold, the controller 110 interrupts the output power 106 to the load 214 by disconnecting the switch 112. In this manner, the switch 112 interrupts the flow of current to the load 214. Once disconnecting the switch 112, the power is provided solely to the auxiliary power 108 from the power supply 102 to support the auxiliary load 216.

The load 214, connected to the power supply 102 through the switch 112 receives the output power 106 when the switch 112 is connected. The load 214, also referred to as the main load and/or primary load, supports the higher powered components, elements, and/or functions.

The auxiliary load 216, connected to the power supply 102 through the output 104, receives the auxiliary power 108 to support the auxiliary load 216. The auxiliary load 216, unlike the load 214, supports the lower powered elements, components, and/or functions. In another implementation, the auxiliary power 108 provides a type of standby operation for the auxiliary load 216.

Figure 2B:
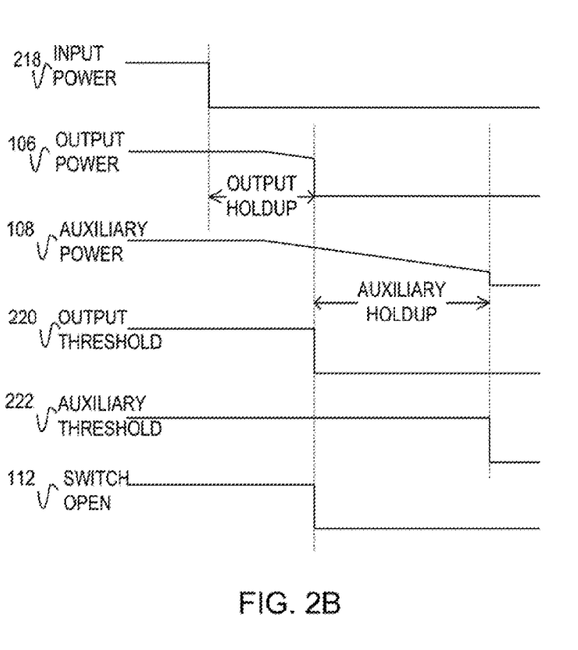
FIG. 2B is a diagram of an example chart illustrating an interruption of output power and an interruption of auxiliary power based on a determination that each power is below a threshold.

FIG. 2B is a block diagram of an example chart illustrating an interruption of output power 106 and an interruption of auxiliary power 108 based on a determination of each power 106 and 108 are below an output threshold 220 and auxiliary threshold 222, respectively. Specifically, FIG. 2B illustrates a power sequencing between the components within a power system. For example, FIG. 2B illustrates the power path of each component over time and how this affects the power paths of other components. Additionally, FIG. 2 illustrates an output holdup shorter in duration than an auxiliary holdup. The holdups are a period of time each power 106 and 108 operates within a specified power range after experiencing a loss of input power. For example, the output holdup is the period of time before the output power 106 falls below the output threshold 220 once the power supply 102 experiences an input power loss. The auxiliary holdup is the period of time before the auxiliary power 108 falls below the auxiliary threshold 222 once the flow of the output power 106 to the load 214 has been interrupted.

The input power 218 is received by the power supply 102 and as such, the signal of the path remains high until receiving a loss of input power as indicated with the low magnitude of power. This loss of input power is received by the power supply 102 and affects the output power 106 and then the auxiliary power 108. After input power is lost at 218, there is a period of time when the output power 106 may maintain. The output power 106 may not change until the power supply 102 has reached a maximum duty cycle. Then, the output power 106 eventually begins to fall (i.e., drop), when the output threshold 220 limit is reached and thus the switch 112 disconnects and the output power 106 shuts off. After this event, the output 104 will continue to utilize a remainder of the stored energy in the power supply 102 to provide the auxiliary power 108 to the auxiliary load 216. The auxiliary power 108 continues to drop in voltage until it reaches the auxiliary threshold 222 (i.e., minimum voltage) is reached. When the auxiliary power 108 falls below the auxiliary threshold 222, the auxiliary power 108 turns off. The auxiliary power 108 turns off by turning off the power supply 102 and/or disconnecting an auxiliary switch connected between the auxiliary load 216 and the power supply 102.

The switch 112 open illustrates the path of power as at the switch 112. For example, the switch 112 initially remains connected, thus the high path of the power 112. Midway through the switch 112 opens (i.e., disconnects), once the output power 106 has fallen below the output threshold 220.

Figure 3:
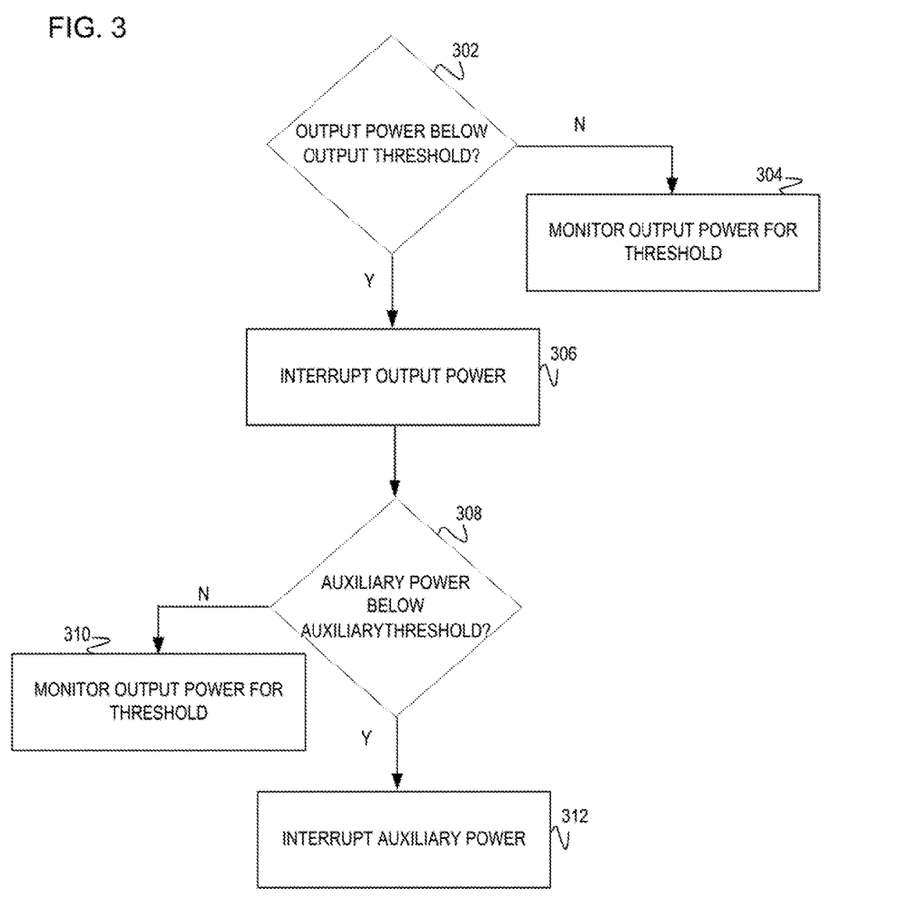
FIG. 3 is a flowchart of an example method to determine whether an output power is below an output threshold and based on the determination to continue monitoring the output power for the output threshold or interrupt the output power, accordingly.

FIG. 3 is a flowchart of an example method to monitor output power and auxiliary power for determining whether to interrupt each of these powers. The method is performed by a controller within a power system. As such, the controller initially determines whether an output power is below an output threshold and based on this determination the controller will continue to monitor the output power or interrupt the output power, accordingly. The controller may then determine whether the auxiliary power is below an auxiliary threshold and either continue to monitor the auxiliary power or interrupt the auxiliary power, accordingly. In one implementation, FIG. 3 illustrates the method of maintaining a power sequencing when the power supply may lose power from a power source. Interrupting the output power and the auxiliary power enables the power supply to maintain a power down sequence from an individual output rather than two different outputs. Maintaining the power down sequence allows for proper fault reporting and to properly power down a server to minimize data loss. Additionally, providing the controller to interrupt the output power and the auxiliary power through an output coupled to the power supply eliminates the use of a separate auxiliary converter to provide the auxiliary power. In discussing FIG. 3, references may be made to the components in FIGS. 1-2B to provide contextual examples. Further, although FIG. 3 is described as implemented by a controller 110 as in FIGS. 1-2A, it may be executed on other suitable components. For example, FIG. 3 may be implemented in the form of executable instructions on a machine readable storage medium, such as machine-readable storage medium 504 as in FIG. 5.

At operation 302, the controller determines whether the output power is below the output threshold. If the output power is below the threshold, the controller proceeds to operation 306. If the output power is equal or above the output threshold, the controller proceeds to operation 304 to continue monitoring the output power. At operation 302, the power supply may receive an indication of an input power loss which may signal to the controller to monitor the output power. Additionally, the controller monitors the output power to determine whether the output power is below the threshold. In this implementation, the controller may utilize a sensor and/or meter to measure the output power to determine whether it may fall below the output threshold. In another implementation, a converter internal to the power supply may include a capacitor which may bleed down to provide power on the output. In this implementation, the controller may monitor for when the power falls below a particular threshold, indicating the main power (e.g., output power) may be powered down.

At operation 304, the controller continues to monitor the output power once it is determined the output power is above or equal to the output threshold. The output threshold corresponds to a voltage regulation of the output power to support the load. In this manner, the controller monitors the output power for the capability of supporting the load. In the situation in which the output power falls below the power regulation (i.e., output threshold), the controller may direct a remaining energy from the power supply to the auxiliary load for support. This features provides the controller additional management of the power system.

At operation 306, the controller interrupts the output power as delivered to a main load once the controller determines the output power is below the output threshold at operation 302. In this implementation, the auxiliary power is provided to the auxiliary load while the output power is delivered to the main load. In another implementation, the controller transmits a signal to a switch which connects an output coupled to the main load. The signal indicates to the switch to interrupt the flow of current from the power supply provided to the main load. In this manner, the controller interrupts the flow of the output power to the main load.

At operation 308, the controller determines whether the auxiliary power has fallen below the auxiliary threshold. The auxiliary power is the power provided to an auxiliary load to perform operations for the power system, excluding the operations performed from the output power. For example, the auxiliary power may be used to host server logs, data files, inventory various functions within a server, etc. The output power is utilized to maintain power for the electrical components. For example, the output power may be utilized to power the hard drive, corresponding memory, a central processing unit, and/or peripheral component interconnect. In this manner, the electrical components may have the output power interrupted at operation 306 prior to the interruption of the auxiliary power of operation 312. Additionally, this implementation enables the operation of the auxiliary load through the auxiliary power for a period extending past when the output power is interrupted at operation 306. In this manner, the auxiliary load may log and/or transmit any errors associated with the power system. Operation 308 may include the controller monitoring the auxiliary power to determine whether the auxiliary power is below the auxiliary threshold. If the auxiliary power is above or equal to the auxiliary threshold, the controller proceeds to operation 310 to continue monitoring the auxiliary power. If the auxiliary power is below the auxiliary threshold the controller proceeds to operation 312 to interrupt the auxiliary power.

At operation 310, the controller continues to monitor the auxiliary power for the auxiliary threshold. The controller proceeds to operation 310 once determining at operation 308 the auxiliary power is at or above the auxiliary threshold. The controller may monitor the auxiliary power through a meter and/or sensor coupled to the auxiliary power.

At operation 312, the controller interrupts the auxiliary power upon the determination the auxiliary power is below the auxiliary threshold as at operation 308. In one implementation, the controller may power down the power supply to complete the power down sequence. In another implementation, an auxiliary switch may be located between the auxiliary load and the power supply. In this implementation, the controller may signal to the auxiliary switch to interrupt the flow of auxiliary power to the auxiliary load through disconnecting (e.g., opening) the switch.

Figure 4:
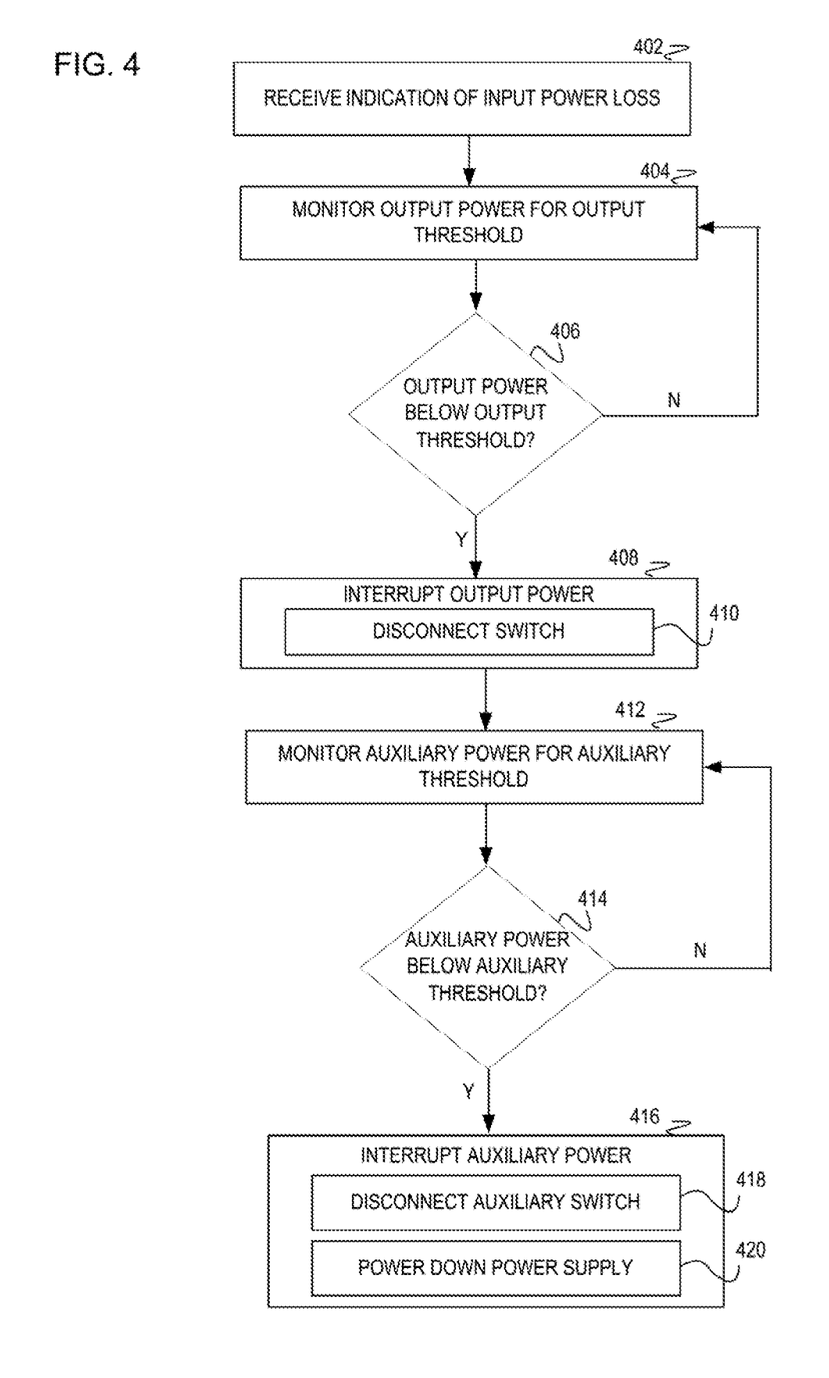
FIG. 4 is a flowchart of an example method to receive an indication of an input power loss and monitor an output power and an auxiliary power for each respective threshold to either interrupt each power and/or continue to monitor each power.

FIG. 4 is a flowchart of an example method to receive an indication of an input power loss and monitor an output power and an auxiliary power for each respective threshold to either interrupt each power and/or continue to monitor each power. FIG. 4 illustrates the method for a power system when the output power and the auxiliary power are out of regulation (e.g., below their respective thresholds). When the output power and the auxiliary power are out of regulations limits, the power system may shut down parts of the power supply to ensure the power system operates with minimal losses. In discussing FIG. 4, references may be made to the components in FIGS. 1-2B to provide contextual examples. Further, although FIG. 4 is described as implemented by a controller 110 as in FIGS. 1-2A, it may be executed on other suitable components. For example, FIG. 4 may be implemented in the form of executable instructions on a machine readable storage medium, such as machine-readable storage medium 504 as in FIG. 5.

At operation 402, the power supply may receive an indication of the input power loss. The power supply may be coupled to a controller so the controller may receive a signal of the input power loss indicating for the controller to proceed to operation 404. In one implementation of operation 402, the loss of the input power may indicate to the controller the alternating current power source connected to the power supply may not be able to provide the energy to the power system.

At operation 404, the controller monitors the output power for the output threshold. In one implementation, the controller may utilize a sensor to take various measurements of the output power to determine if the output power is below the output threshold as at operation 406. The output power is utilized to power central processing unit, memory, and other electrical components within the load (e.g., server).

At operation 406, the controller determines whether the output power is below the output threshold. If the output power is not below the output threshold, the method continues to monitor the output power for the output threshold as at operation 404. If the output power is below the output threshold, the controller proceeds to operation 408 to interrupt the output power to the load. Operation 406 may be similar in functionality to operation 302 as in FIG. 3.

At operation 408, the controller interrupts the flow of output power to the load. The controller interrupts the flow of the output power (e.g., current) based upon the determination the output power is below the output threshold as at operation 406. In another implementation, the controller may signal to a switch in between the power supply and the load to interrupt the flow of current to the load as at operation 410. The output power, unlike the auxiliary power, is a higher magnitude of power delivered to the main load for powering higher powered components. For example, the output power may provide power for the processing units, fans, motors, and/or corresponding memories within a server.

At operation 410, the switch through which the output power is delivered to the load is disconnected. The controller may signal to the switch to disconnect the output power provided to the load. In one implementation, the switch is opened between the power supply and the load. Through disconnecting the switch to interrupt the output power, the controller may direct the remaining energy within the power supply to the auxiliary power ensuring support for the auxiliary load.

At operation 412, the controller monitors the auxiliary power for the auxiliary threshold. The auxiliary power, unlike the output power, provides a lower magnitude of power for the lowered powered functions of the power system by the auxiliary load. For example, these lowered powered functions may include, but not limited to maintaining a data log, hosting a server log, inventory of the components within the server, etc.

At operation 414, the controller determines whether the auxiliary power is below the auxiliary threshold. If the controller determines the auxiliary power is below the auxiliary threshold, the controller proceeds to operation 416. Otherwise, the operation proceeds to operation 412 to continue monitoring the auxiliary power. Operation 414 may be similar in functionality to operation 308 as in FIG. 3.

At operation 416, the controller interrupts the auxiliary power to the auxiliary load. The controller proceeds to operation 416 once determining the auxiliary power is below the auxiliary threshold as at operation 414. In one implementation, the auxiliary switch is opened as at operation 418. In another implementation, the controller powers down the power supply as at operation 420.

At operation 418, the auxiliary switch to the auxiliary load is interrupted, thus interrupting the auxiliary power. Operation 418 includes the controller disconnecting the auxiliary switch to the auxiliary load.

At operation 420, the controller powers down the power supply. In one implementation, the controller may be internal to the power supply to power down. In another implementation, the controller may transmit a signal to the power supply instructing the power supply to power down.

Figure 5:
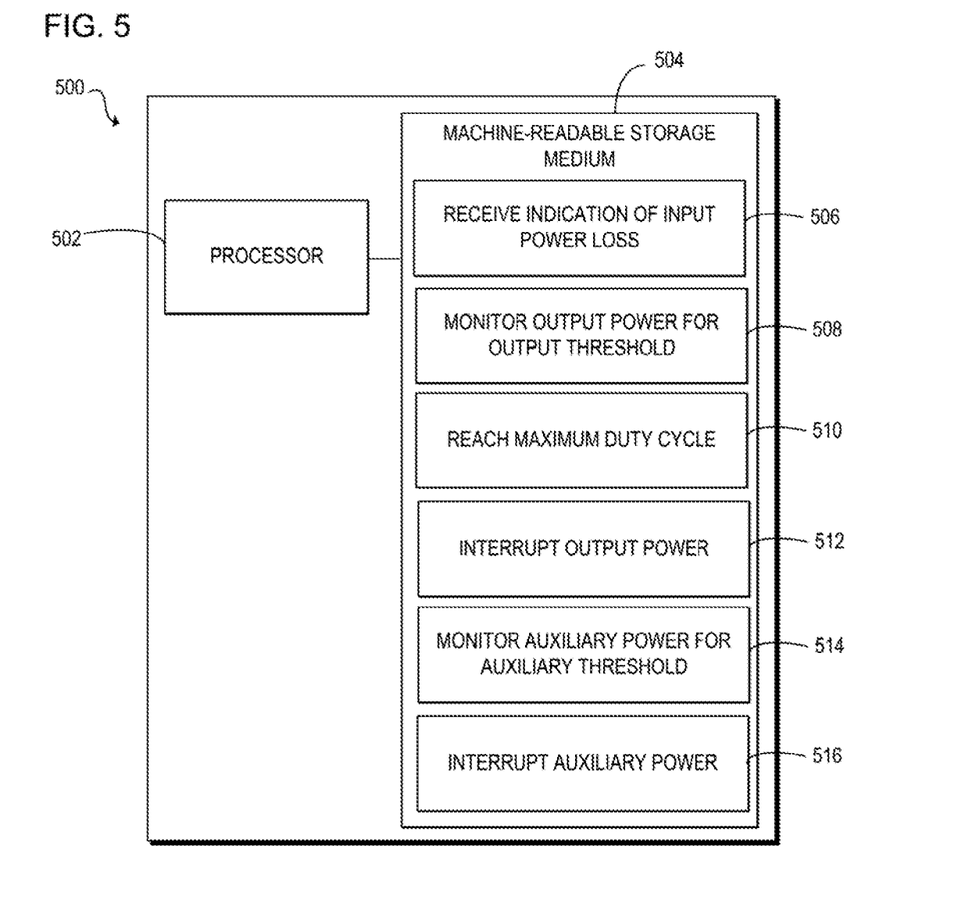
FIG. 5 is a block diagram of an example computing device with a processor to execute instructions in machine-readable storage medium for receiving an indication of an input power loss, monitoring output power and auxiliary power for each corresponding threshold, and interrupting the output power and the auxiliary power based on a determination each power is below the corresponding threshold.

FIG. 5 is a block diagram of computing device 500 with a processor 502 to execute instructions 506-516 within a machine-readable storage medium 504. Specifically, the computing device 500 with the processor 502 is to receive an indication of an input power loss and interrupt an output power and/or auxiliary power, accordingly. Although the computing device 500 includes processor 502 and machine-readable storage medium 504, it may also include other components that would be suitable to one skilled in the art. For example, the computing device 500 may include the power supply 102 and/or switch 112 as in FIG. 1. The computing device 500 is an electronic device with the processor 502 capable of executing instructions 506-516, and as such embodiments of the computing device 500 include a computing device, mobile device, client device, personal computer, desktop computer, laptop, tablet, video game console, or other type of electronic device capable of executing instructions 506-516. The instructions 506-516 may be implemented as methods, functions, operations, and other processes implemented as machine-readable instructions stored on the storage medium 504, which may be non-transitory, such as hardware storage devices (e.g., random access memory (RAM), read only memory (ROM), erasable programmable ROM, electrically erasable ROM, hard drives, and flash memory).

The processor 502 may fetch, decode, and execute instructions 506-516 to receive an indication of a power input loss to a power supply and interrupt the output power and/or the auxiliary power accordingly. In one implementation, once executing instructions 506-508, the processor 502 may then execute instructions 512-516. In another implementation, once executing instruction 508, the processor 502 may then execute instructions 512 and 516. Specifically, the processor 502 executes instructions 506-512 to: receive the indication of the input power loss; monitor the output power for an output threshold; reaching a maximum duty cycle within a power supply; and interrupting the output power based on a determination the output power has fallen below the output threshold. The processor 502 may then execute instructions 514-516 to: monitor an auxiliary power for an auxiliary threshold; and based on a determination the auxiliary power has fallen below the auxiliary threshold, the processor 502 may execute the instruction to interrupt the auxiliary power to an auxiliary load.

The machine-readable storage medium 504 includes instructions 506-516 for the processor 502 to fetch, decode, and execute. In another embodiment, the machine-readable storage medium 504 may be an electronic, magnetic, optical, memory, storage, flash-drive, or other physical device that contains or stores executable instructions. Thus, the machine-readable storage medium 504 may include, for example, Random Access Memory (RAM), an Electrically Erasable Programmable Read-Only Memory (EEPROM), a storage drive, a memory cache, network storage, a Compact Disc Read Only Memory (CDROM) and the like. As such, the machine-readable storage medium 504 may include an application and/or firmware which can be utilized independently and/or in conjunction with the processor 502 to fetch, decode, and/or execute instructions of the machine-readable storage medium 504. The application and/or firmware may be stored on the machine-readable storage medium 504 and/or stored on another location of the computing device 500.

In summary, examples disclosed herein provide a power system to maintain a power down sequence while eliminate an additional power converter. Additionally, the examples maintain a proper powering down sequence to provide more reliable data through enabling the auxiliary power to maintain operation for a longer period of time.

We claim:

1. A system comprising:
   a power supply, coupled to an output, to provide an output power and an auxiliary power;
   a controller to:
     interrupt the output power through a switch, coupled to the output, based on a determination the output power is below an output threshold;
     interrupt the auxiliary power, coupled to the output, based on a determination the auxiliary power is below an auxiliary threshold; and
   the switch to disconnect the output power.

2. The system of claim 1 wherein:
   the power supply is further to receive an input power loss corresponding to the output power; and
   the controller is further to:
     monitor the output power for the output threshold; and
     monitor the auxiliary power for the auxiliary threshold.

3. The system of claim 1 wherein the switch is further to isolate the output power from the auxiliary power.

4. The system of claim 1 further comprising:
   an auxiliary switch to interrupt the auxiliary power to an auxiliary load based on the determination the auxiliary power is below the auxiliary threshold.

5. The system of claim 1 wherein to interrupt the auxiliary power based on the determination the auxiliary power is below the auxiliary threshold, the controller is further to:
   power down the power supply.

6. The system of claim 1 wherein the auxiliary power includes a longer duration of a holdup than the output power.

7. A non-transitory machine-readable storage medium encoded with instructions executable by a processor of a computing device, the storage medium comprising instructions to:
receive, by a power supply, an indication of an input power loss;
interrupt an output power, corresponding to the input power loss, based on a determination the output power is below an output threshold;
interrupt an auxiliary power based on a determination the auxiliary power is below an auxiliary threshold.

8. The non-transitory machine-readable storage medium including the instructions of claim 7 and further comprising instructions to:
monitor the output power for the output threshold; and
monitor the auxiliary power for the auxiliary threshold.

9. The non-transitory machine-readable storage medium including the instructions of claim 7 and further comprising instructions to:
reach a maximum duty cycle by the power supply prior to the interruption of the output power.

10. The non-transitory machine-readable storage medium including the instructions of claim 7, wherein the output power is interrupted prior to the standby power interruption.

11. A method, executed by a controller, the method comprising:
monitoring an output power for an output threshold;
interrupting the output power based on a determination the output power is below the output threshold;
monitoring an auxiliary power for an auxiliary threshold; and
interrupting the auxiliary power based on a determination the auxiliary power is below the auxiliary threshold.

12. The method of claim 1 further comprising:
receiving an input power loss, the input power loss corresponding to the output power.

13. The method of claim 11 wherein interrupting the auxiliary power based on the determination is below the auxiliary threshold is further comprising one of the following:
powering down the power supply; and
disconnecting an auxiliary switch to deliver the auxiliary power from the power supply to an auxiliary load.

14. The method of claim 11 wherein if the output power is above the output threshold, the method is further comprising:
continuing to monitor the output power for the output threshold.

15. The method of claim 11 wherein if the auxiliary power is above the auxiliary threshold, the method is further comprising:
continuing to monitor the auxiliary power for the auxiliary threshold.

* * * * *